United States Patent [19]

Kirn

[11] 4,016,600
[45] Apr. 5, 1977

[54] CARRIER FOR MOUNTING PAIRS OF MAGNETIC HEADS TO A DRUM-TYPE TAPE SCANNING UNIT

[75] Inventor: Thomas G. Kirn, Rochester, NY

[73] Assignee: Eastman Kodak Company, Rochester, N.Y.

[22] Filed: Oct. 14, 1975

[21] Appl. No.: 621,937

[52] U.S. Cl. .............................................. 360/109
[51] Int. Cl.² ..................... G11B 21/24; G11B 5/56
[58] Field of Search ................................... 360/109

[56] References Cited
UNITED STATES PATENTS

| | | | |
|---|---|---|---|
| 3,029,318 | 4/1962 | Fay et al. | 360/109 |
| 3,679,838 | 7/1972 | Salcedo et al. | 360/109 |

*Primary Examiner*—Robert S. Tupper
*Attorney, Agent, or Firm*—G. E. Grosser

[57] ABSTRACT

A carrier plate for use in mounting a pair of magnetic heads at diametrically opposite sides on a rotatable head drum section facilitates positioning adjustments to remove dihedral head positioning error. Independent dihedral position adjustment is made possible by virtue of a specially shaped slot in the carrier plate, which slot is characterized by two guide edges that are perpendicular to the head pair axis and are adapted to closely engage a shaft or other axis-identifying means associated with the drum section. Such guide edges in cooperation with the shaft permit relative movement between the carrier plate and drum section in a direction to correct dihedral error while blocking movement in directions which would disturb other alignment geometries. In a preferred implementation, the carrier plate has a generally disc-like form.

4 Claims, 5 Drawing Figures

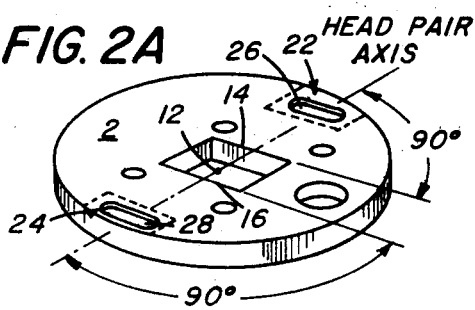
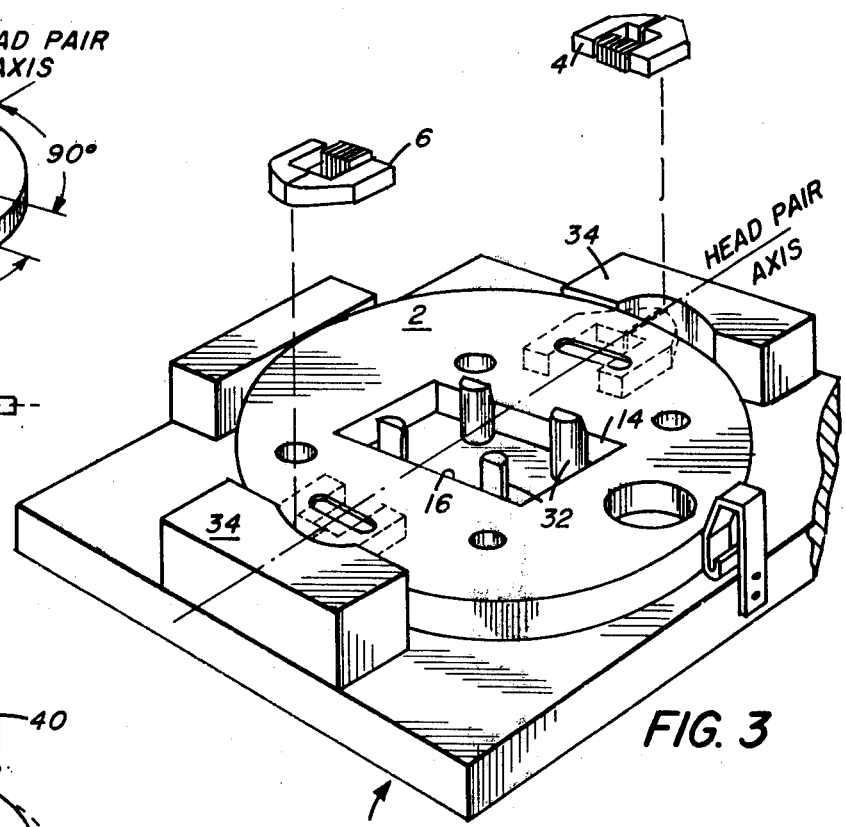
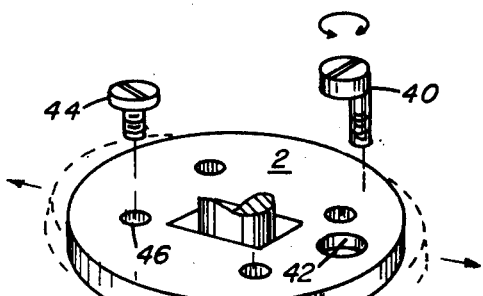
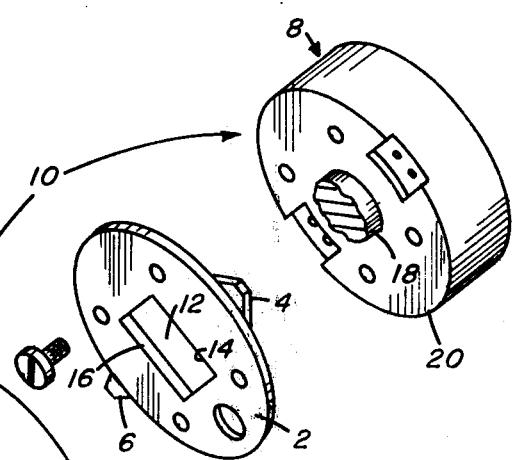
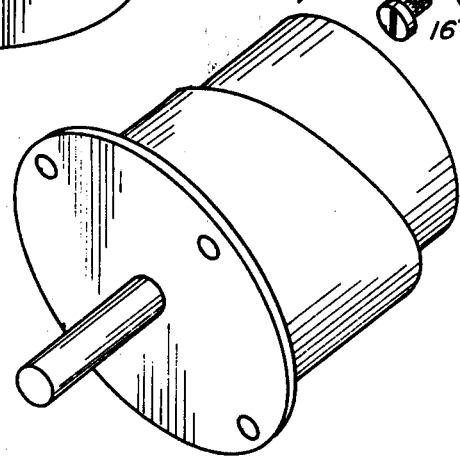

CARRIER FOR MOUNTING PAIRS OF MAGNETIC HEADS TO A DRUM-TYPE TAPE SCANNING UNIT

BACKGROUND OF THE INVENTION

1. Field of the Invention

This invention relates to carriers for mounting magnetic heads to a drum section of a helical scan magnetic tape unit.

2. Description Relative to the Prior Art

Accurate positioning of magnetic heads with respect to a rotatable head drum element is essential for proper operation of most types of magnetic tape scanning units. Such head alignment requirements, moreover, tend to become more exacting as the recorded information density increases. With helical tape scanning, as is commonly employed in video recording, magnetic heads generally cooperate in pairs arranged on opposite sides of a drum section, and such use of cooperating head pairs further complicates the problems of head alignment by introducing critical head pair alignment geometries.

Usually, it is desired that the heads of a head pair trace a common circular path as they are rotated. To satisfy such a requirement, the heads of a cooperating pair must be aligned to rotate in a single plane (coplanar alignment) and, for units characterized by a helical tape wrap path, a plane normal to the head drum axis is almost always chosen. In the absence of coplanar alignment for the head pair under discussion, the tracks produced by a helical scanner depart from the desired uniform spacing and, instead, alternate between wide and narrow spacing. Such spacing variation, if significant in relation to track width, may frustrate proper tracking of the recorded information. Either the recording or the playback scanner, it should be appreciated, may be subject to coplanarity error and, hence, cause such a tracking failure.

Further important alignment geometries relate to the arrangement of the heads within their plane of rotation and with respect to the head drum axis. To assure that the heads of a head pair trace the same circle, the radial distances of the heads from the head drum axis must be uniform and, moreover, to achieve a desired head response, the protrusion of the heads beyond the drum section periphery must be within a preselected tolerance.

An alignment geometry which is particularly critical relates to the positioning of the axis which passes through the heads of a head pair (head pair axis) with respect to the rotary head drum axis. Such alignment is commonly referred to as dihedral alignment. Generally, the head pair axis must intersect the rotary head drum axis (some scanners do, however, incorporate a fixed angular offset — see, for example, U.S. Pat. No. 3,391,248). If such axes do not intersect, i.e., if there is dihedral error, the start points of scan tracks will alternate in distance from the tape edge and, if the unit is used for video scanning, picture jitter is a likely consequence of such offsetting of tracks.

To deal with the complex geometries of head alignment, various head mounting arrangements have been proposed.

One approach calls for direct bonding of the heads to a rotatable drum section. This approach generally results in an expensive head carrying element and does not lend itself to economical head replacement. Furthermore, no adjustment after bonding is possible and all of the alignments, both for the individual heads and for cooperating head pairs, must be accomplished in one operation.

To permit adjustment flexibility and ease of head replacement, a variety of head carriers have been proposed which allow for adjustments to the arrangement of the individual heads. Certain of these allow for adjustment along preselected paths; for example, along a chord of a rotating drum section (U.S. Pat. No. 3,679,838). Others provide several adjustments for positioning individual heads; for example, U.S. Pat. Nos. 3,319,015 and 3,882,543.

In U.S. Pat. No. 3,422,230, there is described a rectangular strap which acts as a carrier for a pair of heads. The strap is adapted to be mounted to a scanning disc of the head drum. All head and head pair alignment is intended to be performed prior to attachment of the strap to the scanning disc. While such prior alignment is somewhat advantageous, it requires rather exact mating of the strap to the scanning disc and exact positioning of the mating surfaces relative to the scanning disc axis. Should one alignment, say dihedral, prove to be incorrect, then apparently the heads must be individually repositioned to remove the alignment error.

SUMMARY OF THE INVENTION

The invention takes recognition that, in fastening a pair of magnetic heads to a rotatable drum section of a magnetic scanning unit, certain of the multiple alignment geometries of concern are more critical than others and are desirably isolated for separate fine adjustment. To isolate the critical dihedral alignment, while utilizing a carrier having head sites at opposite sides of one carrier face, the invention proposes to provide such a carrier with a slot having two parallel guide edges which are perpendicular to the axis defined by the heads (head pair axis) — such edges being adapted to closely engage a shaft or other axis-indicating means associated with the rotatable drum section. Such a slot, in cooperation with the shaft, serves to permit movement of the carrier relative to the drum section along an axis for removing dihedral error while blocking relative movement along the head pair axis, i.e., movement which would disturb the radius distance alignment of the individual heads. With specially slotted carriers according to the invention, it hence becomes possible to make independent dihedral adjustments by relative positioning of the carrier and associated heads, as a unit, with respect to the rotatable drum section.

By using a flat carrier plate having such a slot, the coplanarity and radius distance alignment operations may be performed conveniently with respect to the plate itself, prior to mounting on the drum section and, as will be explained more fully below, it becomes practical to bond the heads directly to the carrier plate.

Using a flat carrier plate, for example a carrier disc, a face of the carrier plate may serve to define a reference plane for coplanar alignment of the heads of a head pair. Preferably, a planar face area perpendicular to the head gap is provided on each head unit, which area engages or is otherwise referenced to a face plane of the carrier to assure that the heads are aligned in a common plane. Such a carrier plate with heads affixed is preferably mounted in engagement with an accurately defined face plane of the rotatable drum section. The angle of the head plane to the drum section axis is then the same as the corresponding angle of such face plane (generally 90°) and, it will be appreciated, such angle remains unchanged as the carrier is caused to slide across such face plane for purposes of the dihedral adjustment discussed above.

In order to align the heads of a pair for radius distance prior to mounting the carrier on the rotatable drum section, recognition is taken that the above-described guide edges may serve to reference the drum section axis. This is because the guide edges engage the axis-identifying means at points which are predetermined distances from the drum section axis (e.g., the shaft radius distance of the shaft is used for axis identification). Hence, using a coarse estimate of the head pair axis, reference points may be established on the guide edges for determining the head radius distances which will obtain when the carrier is mounted to the rotatable drum section.

With the preferred flat head carrier plates according to the invention, it is practical, as mentioned above, to bond the heads of a head pair directly to the carrier. Such is the case, in part, because the alignments which are unalterably fixed in the bonding operation can be referenced to the carrier itself. More specifically, such alignments may be referenced to the guide edges and flat parallel faces of the preferred carriers. The difficult dihedral alignment, on the other hand, is deferred, by virtue of the special carrier slot, for adjustment when the carrier is mounted to the particular drum section to which the head pair axis is to be referenced. Not only is the dihedral alignment enabled to be deferred with such carriers, but dihedral alignment is also caused to be adjustable independently of other alignments.

In a preferred implementation of the invention, eccentric means, such as a screw with an eccentric head, operates to move the carrier relative to the drum section to facilitate the fine adjustment which is desirable in removing dihedral error.

The invention will now be described in detail with reference to the drawings, wherein:

FIG. 1 is a perspective view illustrating the arrangement of a head carrier according to the invention within one form of head drum assembly;

FIG. 2A is a perspective view of a mounting disc according to the invention;

FIG. 2B is a cross-sectional view of the head carrier of FIG. 2A with head in place;

FIG. 3 is a perspective view representing a fixture which may be used in aligning pairs of heads on the disc of FIG. 2A; and FIG. 4 is a perspective view illustrating adjustment to remove dihedral error with head carriers according to the invention.

For purposes of clarity, certain dimensions are exaggerated in the figures to facilitate explaining the invention.

Referring to FIG. 1, a presently preferred carrier plate 2 for a pair of cooperating magnetic heads 4 and 6 is adapted to be mounted on a rotatable drum section 8 of a split helical-scan head drum 10. According to the invention, the carrier plate 2 has a slot 12 defined in part by two guide edges 14 and 16 which, as will be discussed more fully below, closely engage a shaft 18 or other axis-identifying means associated with drum section 8. One face of the carrier plate 2 is adapted to engage a plane-defining surface or surfaces 20 of the drum section 8, and such engagement serves to define the angular relationship of the carrier to the head drum axis (generally, 90° is chosen).

Referring now to FIG. 2A, a carrier plate 2 according to the invention has two diametrically opposite head sites 22 and 24, respectively, which serve to define a head pair axis passing generally through the centers thereof. To provide for the coils of heads 4 and 6, recesses 24 and 28 are formed at the sites 22 and 24, respectively. Preferably, planar reference areas are formed on heads 4 and 6 perpendicular to the head gap, which areas engage or otherwise reference (i.e., are parallel to and at a uniform separation distance from) a face plane of carrier plate 2 and are consequently caused to lie along a common head plane parallel to the faces of the carrier plate 2 (see FIG. 2B). Because the faces of the carrier plate are parallel to the surface 20 of the drum section, the head plane angle is established by the angle of the surface 20 to the drum section axis.

In accordance with the invention, the guide edges 14 and 16 of slot 12 are straight and are perpendicular to the head pair axis, at least in the operative region near the head pair axis (see FIG. 2A). By so arranging the guide edges 14 and 16, and furthermore by spacing such edges to closely engage the axis-identifying shaft 18 (see FIG. 1), translational movement of carrier plate 2 relative to rotatable drum section 8 can occur only in a direction perpendicular to the head pair axis. Hence, translational movement along the head pair axis, which motion would change head pair radius distance alignments, is blocked.

Referring to FIG. 3, a simple fixture 30 may be utilized in producing a carrier unit according to the invention, with heads affixed. A set of pins 32 reference guide edges 14 and 16 with respect to fixture 30. A head pair axis is coarsely defined at a fixed distance from the edge of the carrier plate 2 and the heads 4 and 6 are placed at preselected distances along the head pair axis from guide edges 14 and 16, respectively, e.g., as determined using a set of simple blocking elements 34. Preferably, the heads 4 and 6 are bonded in place on the carrier plate 2. The carrier plate 2 with heads bonded thereto then becomes a simple and convenient unit for use in installing or replacing a set of heads and requires only that dihedral alignment of the heads be performed during the installation.

Referring now to FIG. 4, fine adjustment to align the head pair axis to intersect with the head drum axis (dihedral alignment) is preferably effected using eccentric means such as pin 40 having a shaft which fits into a bore in drum section 8 and an eccentric head which fits snugly into a hole 42 in the carrier plate 2. The hole 42 is preferably located along a line which is perpendicular to the head pair axis, and which line intersects the head pair axis midway between the heads 4 and 6 (see FIG. 2A). Rotation of pin 40 causes a gradual translation of the carrier plate 2 over the drum section 8 (as indicated by phantom lines). As discussed above, the slot 12, in cooperation with the shaft 18, limits the resulting translational movement of carrier plate 2 to be along an axis for dihedral carrier adjustment. To mount carrier plate 2 to the drum section 8 and yet allow for relative movement for purposes of adjustment, mounting screws 44 which thread into bores in drum section 8 pass through a set of clearance holes 46 formed in the carrier plate 2. Upon arriving at a satisfactory dihedral adjustment, screws 44 are tightened securely to prevent further movement of carrier plate 2.

The invention has been described with reference to a presently preferred implementation thereof; however, it will be appreciated that alternatives within the spirit and scope of the invention will be suggested to those skilled in the art. For example, means other than the shaft of the drum section may be utilized to reference the drum section axis, and such means may be offset from such axis a fixed distance. Also, a removable adjustment post or fixture associated with the drum section might also be used to reference the drum section axis. A rectangular carrier plate might be employed; however, a disc-like carrier plate is preferred to achieve a more symmetrical weight distribution.

What is claimed is:

1. For use with a head drum of the type which (1) is employed in units for scanning magnetic tape with a cooperating pair of magnetic heads, and (2) has a drum section which is rotatable about an axis and is provided with an associated axis indicating means at a face thereof for defining two parallel reference lines at preselected fixed distances from said axis, a carrier for mounting such a pair of heads to such face of the drum section, comprising:

a flat member having defined at opposite sides thereof a pair of respective head sites which establish a head pair axis extending therebetween, said member having formed therein a slot characterized by two guide edges which, at least over operative parts thereof, are substantially straight and are substantially perpendicular to said head pair axis, said edges being arranged at respective distances from the midpoint between said head sites corresponding to such preselected distances to closely engage in a sliding relationship such axis indicating means, thereby blocking relative translational motion of said member over said drum section along the head pair axis while permitting relative translational motion perpendicular to that axis to allow for dihedral carrier alignment; and means for adjustably fastening said flat member to such a drum section.

2. A carrier according to claim 1 wherein said flat member is a disc, and such slot is defined centrally on said disc and has a substantially rectangular configuration, two opposite edges thereof being substantially perpendicular to the head pair axis and acting as said guide edges.

3. In a head drum for use in a magnetic tape scanning unit and being of the type having a drum section which is rotatable about an axis, such section being provided with an end face defining a plane at a preselected angle to the drum section axis and a coaxial cylindrical member extending from such face, a head carrier unit, comprising:

a carrier plate having two head sites defined on opposite sides of a flat receiving face thereof, which sites establish a head pair axis passing therebetween, said plate further having a central slot extending therethrough which receives such a cylindrical member, which slot is characterized by two guide walls that are straight and are perpendicular to said head pair axis over at least the operative portions thereof, said guide walls being spaced, over their operative portions, at respective distances from the midpoint between the head sites corresponding within a close-fit tolerance to the radius of the cylindrical member to cooperate with such member in blocking relative movement along the head pair axis, said slot being elongate perpendicular to said guide walls to permit movement perpendicular thereto;

a pair of magnetic heads having flat reference surfaces formed thereon, said reference surfaces being bonded to the flat receiving face of the carrier plate at respective head sites, thereby assuring substantial head coplanarity in a plane parallel to said flat receiving face, said flat receiving face being arranged in engagement with such a plane-defining face of the drum section to establish the angle of the head plane with respect to the drum section rotary axis; and means for adjustably fastening said carrier plate in engagement with said flat receiving face of said drum section.

4. For use with a head drum of the type having a cylindrical drum section which is rotatable about an axis and is provided at one end with a coaxial cylindrical shaft, a head carrying structure mountable to the shaft end of such a drum section, comprising:

a. a disc-like member having two flat parallel faces and having defined at diametrically opposite sides of a first such face a pair of respective head sites which establish a head pair axis passing therebetween, said member having formed therein a centrally located slot for receiving such a shaft, such slot being characterized by two guide edges which, at least over operative portions thereof, are substantially straight and are substantially perpendicular to said head pair axis, said edges being spaced to closely embrace such shaft in a sliding relationship, thereby blocking relative translational movement of said member over the shaft end of said drum section in the direction of said head pair axis while permitting relative translational movement perpendicular to that axis to allow for dihedral carrier alignment;

b. a pair of heads mounted at said head sites; and c. means for fastening the disc-like member to the shaft end of the rotatable drum section.

* * * * *